Jan. 8, 1952         G. W. MORK ET AL         2,581,430

FLUID PRESSURE CONTROL VALVE AND ASSOCIATED PARTS

Filed Jan. 23, 1946         2 SHEETS—SHEET 1

INVENTORS,
George W. Mork,
Gottfried Reuter,
BY Roger Sherman Hoar
ATTORNEY

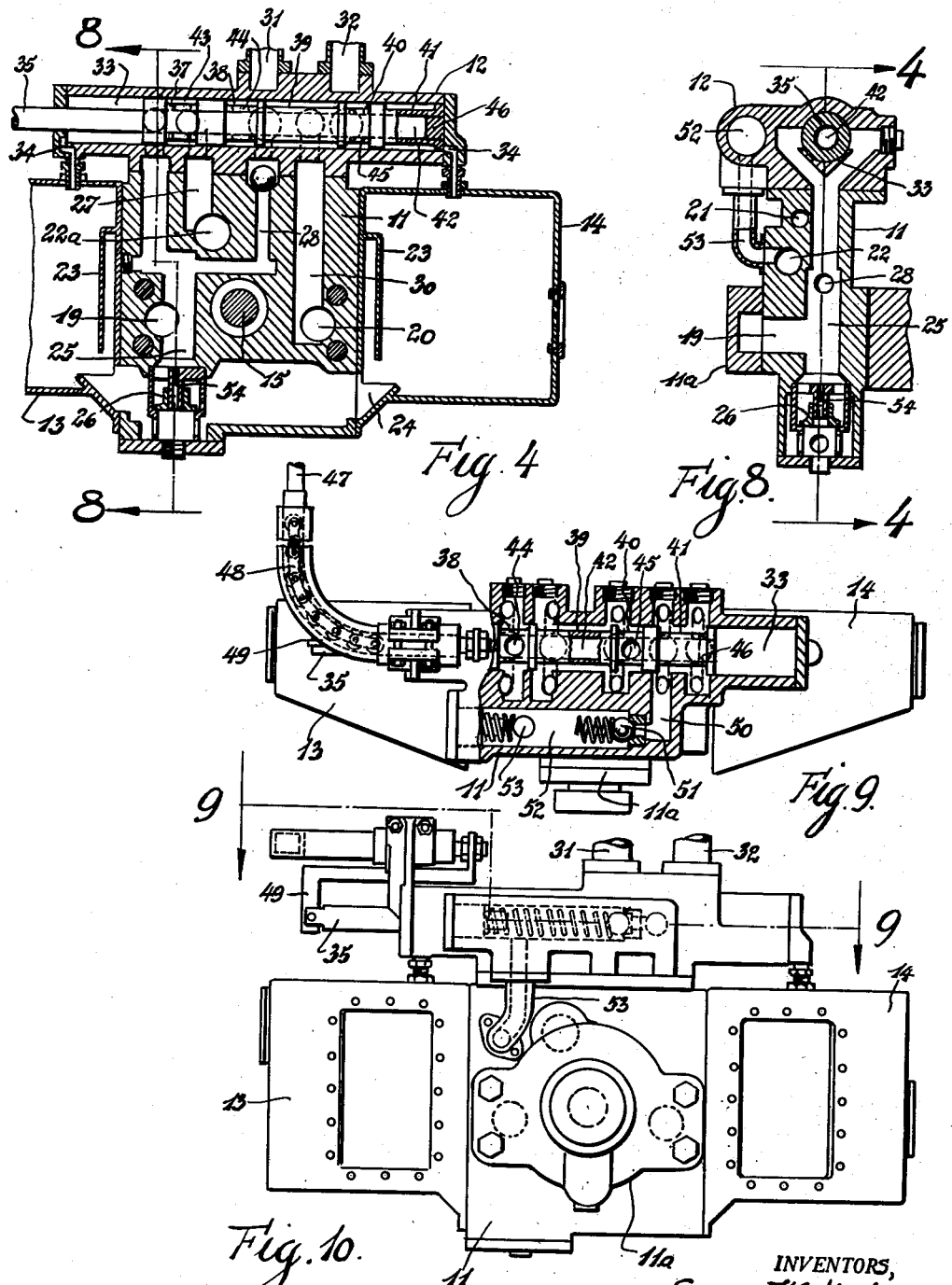

UNITED STATES PATENT OFFICE 2,581,430

FLUID PRESSURE CONTROL VALVE AND ASSOCIATED PARTS

George W. Mork and Gottfried Reuter, South Milwaukee, Wis., assignors to Bucyrus-Erie Company, South Milwaukee, Wis., a corporation of Delaware Application January 23, 1946, Serial No. 642,924

8 Claims. (Cl. 60—52)

Our invention relates to new and useful improvements in hydraulic units, and more particularly in such units to be mounted on the front of a tractor, to be driven by the engine of the tractor for actuating hydraulic bulldozers and other tractor-carried or tractor-drawn equipment. Such units comprise an hydraulic storage tank or tanks, an hydraulic pump, control valve means for the control of the flow to and from the pump, means for actuating the valve, and the various incidental conduits, relief valves, and one-way valves.

The principal object of our invention is to provide such a unit which will be simple, compact, and accessible, and which will in no way hinder the natural functions of the tractor as for instance the free flow of cooling air through the radiator.

Other objects are to arrange the component parts of our unit in such a manner that fluid leakage past the control valve and that the bearing chambers of the pump, can be drained into the tanks, which are constantly at atmospheric pressure.

Further objects are: to provide means for routing the return fluid to the pump through the tanks, rather than direct, in hold (i. e., neutral) and float positions, while still directing the return fluid to the pump in lower position; and to the pump and tanks in raise position; and to by-pass the fluid around the pump when lowering with the pump dead; thereby combining, insofar as possible all the advantages of both an open system and a closed system, with none of the disadvantages of either.

A further object is to devise a control-valve unit which may be used interchangeably with a cylinder-piston assembly in which the piston-rod is in one end, and a cylinder-piston assembly in which the piston-rod is in the other end. Most of the features of our invention are equally applicable, regardless which type of assembly is employed. One feature functions only with one type, but is not needed with the other. And one feature functions better with one type than with the other, although effective with both.

A further object of our invention is to improve some of the elements of our unit individually. The thus-improved elements may have use in combinations other than our complete unit. More specifically, we aim to improve the control valve per se.

In addition to the objects above stated, we have worked out a number of novel and useful details, which will be readily evident as the description progresses.

Our invention consists in the novel parts, and in the combination and arrangement thereof, which are defined in the appended claims, and of which one embodiment is exemplified in the accompanying drawings, which is hereinafter particularly described and explained.

Throughout the description, the same reference number is applied to the same member or to similar members.

Referring now to the accompanying drawings, it will be seen that:

Figure 4 is a transverse vertical section of our unit, with the control valve in "float" position.

Figure 5:
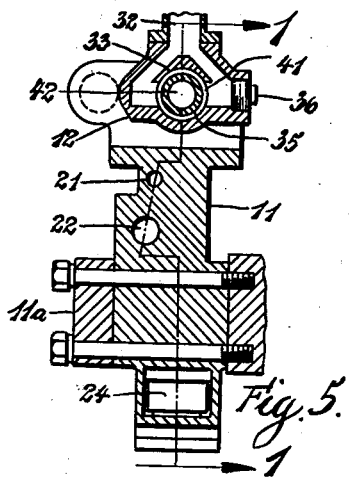

Figures 5 to 8 are fore-and-aft vertical sections of our unit. For mere convenience of showing, each of these figures is related to that one of Figures 1 to 4 beside which it is placed. Thus Figure 5 is conceived of as a section taken along the line 5—5 of Figure 1; and reciprocally Figure 1 is conceived of as taken along the line 1—1 of Figure 5, and so on.

Figure 9 is a horizontal section of our unit, taken through the control valve along the line 9—9 of Figure 10.

Figure 10 is a front elevation of our unit.

Figure 1:
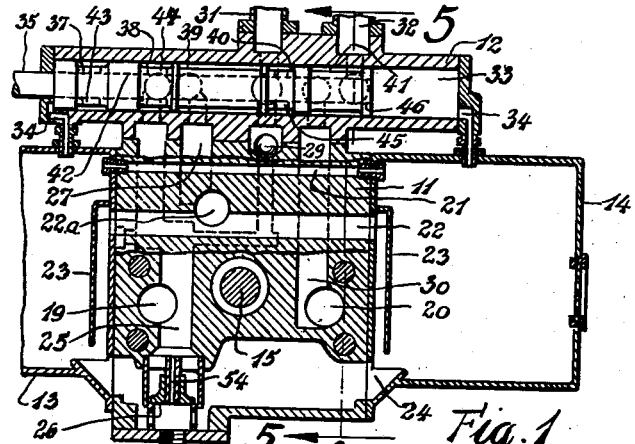
Figure 1 is a transverse vertical section of our unit, with the control valve in "raise" position.

Referring now to the figures, and more particularly to Figure 1, we see that 11 is the main housing, containing most of the conduits. Auxiliary housing 11a attached thereto, and best seen in Figure 7, contains the pump, which will be referred to later herein. 12 is the control-valve casing, resting on top of the main housing. And 13 and 14 are the two oil tanks, attached to the sides of the main housing. It is to be noted that these tanks slope backwardly outwardly; this is so that they will clear the push-arms of an angling bulldozer whenever used therewith. The general conformation of this combination of these four main elements may be seen by an inspection of Figures 9 and 10.

The drive shaft 15 of our unit is journaled in main housing 11, and (see Figure 7) can be coupled to the front power-take-off shaft of the tractor (not shown) by means of splines 16. On the other end of this shaft is a notch 17, for attaching the starter-handle.

This shaft 15 operates the gear-pump 18, which may be any conventional sort.

Reverting now to Figure 1, we see that 19 is the intake of this pump, and that 20 is the delivery outlet of this pump.

Passage 21 is the air-pressure equalizer between tank 13 and tank 14. Passage 22 is the normal means for the return of oil to the two tanks. Baffles 23 prevent the incoming oil from frothing up the surface of the oil in the two tanks. And passage 24 is the oil equalizer between the two tanks.

Figure 2:
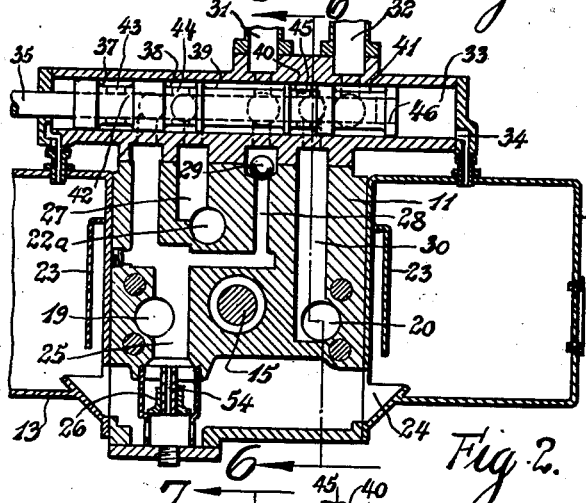
Figure 2 is a transverse vertical section of our unit, with the control valve in "hold" position.

Turning now to Figure 2, we see that 25 is a vertical passage, connecting with pump intake 19 already mentioned, and check-valve 26. 27 is a vertical passage, connecting by means of fore-and-aft passage 22A with transverse passage 22 already mentioned. 28 is an L-shaped passage, containing a check-valve 29, and connecting with vertical passage 25. 30 is a vertical passage, connecting with pump outlet 20 already mentioned.

At the top of each of these four passages, 25, 27, 28 and 30, there is an unnumbered entrance to the control-valve casing 12. At the top of the control-valve casing 12, there are two openings, respectively for pipe 31 which leads to that end of the cylinder-piston assembly (not shown) known as "lower," and pipe 32 which leads to that end of the cylinder piston assembly known as "raise." Within the control-valve casing there is bored a transverse horizontal cylindrical valve seat 33, each end of which is provided with a small bleeder 34, to prevent the build-up of pressure or vacuum in either end of the valve, and to permit the return to the tanks of any oil which may leak by the plunger 35 to either end of the valve.

Turning now to Figure 5, we see that pipe 32 branches to form two horizontal ports at the opposite sides of the plunger 35. It will be noted that the two branches can be bored through the top opening, and that the two ports can be bored through the side of the valve-casing 12, and then sealed by screw-plug 36. The object of the branching and of the opposed ports is to equalize the pressure on the plunger, so as to prevent it jamming, due to unequalized pressure.

Figure 6:
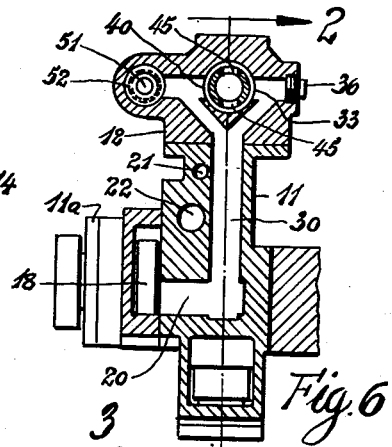

Turning now to Figure 6, we see a similar approach by passage 30 to the valve seat.

Figure 7:
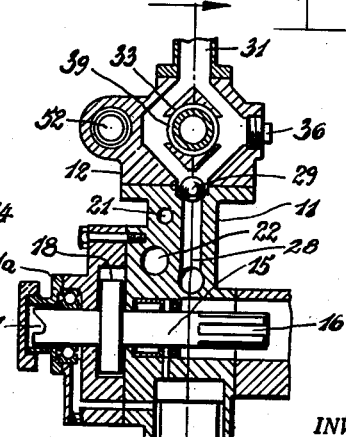

Turning now to Figure 7, we see a similar simultaneous approach by pipe 31 and passage 28.

Turning now to Figure 8, we see a similar approach by passage 25.

Now comparing Figures 1 and 9, let us consider the construction of the valve-plunger 35. Externally it will be seen to be made up of a series of annular depressions 37, 38, 39, 40, and 41, separated by rings of the full diameter of the cylindrical seat 33. Lengthwise of the plunger, there is a bored passage 42, which connects with annular depression 37 by means of radial holes 43, with annular depression 38 by means of radial holes 44, and with annular depression 40 by means of radial holes 45. Annular depressions 39 and 41 do not connect with the bore of the plunger.

Bore 42 is closed by plug 46.

Plunger 35 is actuated by rod 47, acting through chain 48 (which will be the subject-matter of a separate patent), and offset Z-shaped lever 49. See Figures 9 and 10.

Comparing Figures 6, 8, 9 and 10, we see that the forked top of vertical passage 30 communicates with a forwardly projecting passage 50, which in turn communicates through a relief-valve 51 with horizontal passage 52, downward pipe 53, and horizontal passage 22. The object of this relief-valve is to relieve overloads on the pump if the instrumentality which the cylinder-piston operates, becomes stalled.

Let us now consider the effects of the four alternative settings of the valve-plunger 35. For simplicity, we shall for the present, recite merely the main connections.

First, the raise position as shown in Figure 1. Fluid under pressure is delivered by the pump, through outlet 20, vertical passage 30, annular depression 41, and pipe 32, to the raise end of the cylinder (not shown). Return fluid from the lowering end of the cylinder follows two courses, the first of which is: pipe 31, annular depression 40, radial holes 45, bore 42, radial holes 44, vertical passage 25, and intake 19. The second is: pipe 31, annular depression 39, vertical passage 27, horizontal passage 22A, and passage 22 to the two tanks. If the piston-rod be located in the raise end of the cylinder, excess return fluid due to piston-rod displacement will return direct to the tanks through the second above-mentioned course. But if the piston-rod be located in the lowering end of the cylinder, there will be a shortage of return-fluid due to piston-rod displacement, and possibly a slight additional shortage due to some fluid by-passing the pump through the second above-mentioned course, which shortages will be met by raising check-valve 26, and drawing from the tanks.

Secondly, the hold position, as shown in Figure 2. Pipes 31 and 32 are now both blocked off. Fluid under pressure is delivered by the pump, through outlet 20, vertical passage 30, annular depression 40, radial holes 45, bore 42, radial holes 44, annular depression 38, vertical passage 27, fore-and-aft passage 22A, and transverse horizontal passage 22, to the two tanks 13 and 14, whence it is sucked up, through check-valve 26 and inlet 19, into the pump again.

Figure 3:
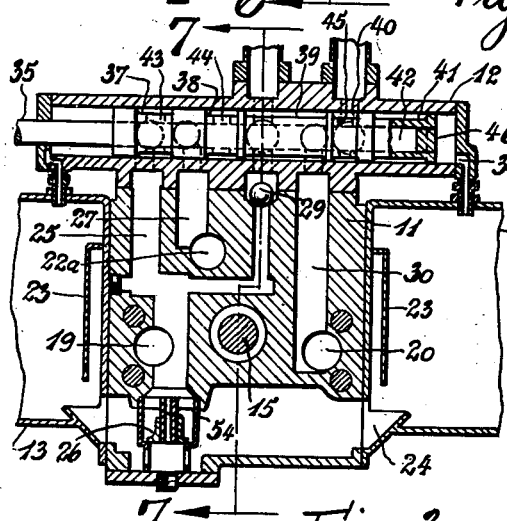
Figure 3 is a transverse vertical section of our unit, with the control valve in "lower" position.

Thirdly, the lower position, as shown in Figure 3. Fluid under pressure is delivered by the pump, through outlet 20, vertical passage 30, annular depression 39, and pipe 31, to the lowering side of the cylinder (not shown). Return fluid, from the raise side of the cylinder, passes through pipe 32, annular depression 40, radial holes 45, bore 42, radial holes 43, annular depression 37, vertical passage 25, and intake 19, to the pump. If the piston-rod be located in the lowering end of the cylinder, the check-valve 26, acting under the pressure of the return fluid, will close the passage to the tanks, and the return fluid (except the excess due to piston-rod displacement) will all be directed to the pump intake 19. This not only regeneratively helps the pump, thus saving power and reducing heat, but also gives us controlled lowering, in much the same way as one gets controlled coasting down hill in an an automobile by setting one's gear-shift in second gear. The excess fluid, due to piston-rod displacement, escapes to the tanks through bleeder-hole 54, which is preferably but not necessarily located in check-valve plunger 26.

And even if the piston-rod be located in the raise end of the cylinder, the piston-rod displacement is taken care of by a vacuum in the lowering end of the cylinder, so that we still get the closing of check-valve 26, and the regeneration will still take place, during lowering. As soon as lowering stops, check-valve 26 will open, and the vacuum will be relieved by fluid sucked through check-valve 26 by the pump, and delivered to the lowering end of the cylinder, assisted to some extent by flow through ball-check 29.

It might be thought that during lowering in both the above situations, the return-fluid would by-pass the pump through passage 28 and ball-check 29, thus destroying the regenerative pressure at pump intake 19. But such is not the case, for we are here dealing with a dynamic rather than a static situation. Passage 28 is so relatively constricted that only a portion of the return fluid has time to pass through it during lowering, and accordingly the pressure at intake 19 is only partially reduced in installations in which the piston-rod is located in the raise end of the cylinder, and the reduction is negligible (due to the absence of vacuum) in installations in which the piston-rod is located in the lowering end of the cylinder.

Fourthly, the float position, as shown in Figure 4. Pipes 31 and 32 intercommunicate and communicate with pressure, through annular depression 39. They also intercommunicate, and communicate with return flow, through annular depressions 38 and 40 respectively, and radial holes 44 and 45 respectively, and radial holes 43, annular depression 37, vertical passage 27, fore-and-aft passage 22a, transverse passage 22, the two tanks, check valve 26, and intake 19. Inasmuch as the return fluid passes through the tanks, there is no need to compensate for piston-rod displacement.

Let us now consider the important features of the above-described apparatus:

A. Note that all the ports, passages, etc., are bored rather than cored. This constitutes a great constructional improvement.

B. When the control valve is in raise position, the double routing of the return fluid from the cylinder has the following advantageous effect, if our unit be used with a cylinder-piston assembly in which the piston-rod is located in the raise end of the cylinder (such as bulldozers of the sort shown and described in U. S. Patent No. 2,221,813): namely of saving the pump from having to lift against the back-pressure due to by-passing the excess return-fluid through a bleeder-hole. Cylinder-piston assemblies in which the piston-rod is located in the lowering end of the cylinder (such as tractor-shovels of the sort shown and described in U. S. Patent No. 2,345,620) do not have any such back-pressure anyway.

C. When the control valve is in position to lower, then regardless which end of the cylinder contains the piston-rod, we get the regenerative effect and the controlled lowering already mentioned, due to the return-fluid being cut-off from the tanks by the closing of check-valve 26. This regenerative effect is most marked in the tractor shovel, where it is more needed than in the bulldozer.

D. When lowering with the pump dead, instead of so much return fluid entering the tanks from the raise end of the cylinder that the tanks have to be built extra large to accommodate it, and instead of a vacuum building up in the lowering end of the cylinder, most of the return fluid going out through vertical passage 25, or (depending on the arrangement of piston-rod displacement) all of this return fluid plus some more from the tanks, is sucked through passage 28 and valve 29 into the lowering end of the cylinder.

E. In hold and float positions, as already described, the return fluid is discharged into the tanks, rather than to return directly to the pump. Thus we have all the advantages of an open circuit in hold and float positions.

F. When floating, if the pump goes dead, the fluid will by-pass the pump through annular depression 39. Any excess fluid will pass off through passage 27 to the tanks. And any shortage of fluid will be made up through valve 26, passages 25 and 28, and valve 29.

G. The position of the tanks, alongside the pump-block, has three advantages: (1) it eliminates the need of high-pressure seals on the bearing chambers of the pump; (2) the tanks do not block the flow of air to the radiator of the tractor; and (3) control-valve leakage can be drained into the tanks.

Thus it will be seen that our unit has all the advantages of an open system in hold and float positions, and in raise position whenever there would be back-pressure in a closed system, and in lower position if the pump goes dead; but otherwise has all the advantages of a closed system in raise and lower positions.

Our claims are directed to all seven features.

Having now described and illustrated one form of our invention, we wish it to be understood that our invention is not to be limited to the specific form or arrangement of parts herein described and shown.

We claim:

1. In a fluid-pressure distributing valve, the combination of: a valve-casing, having a longitudinal cylindrical bore to serve as a valve seat, and having radial holes connecting with the longitudinal bore, to serve as ports; and an axially movable cylindrical plunger snugly fitting in the longitudinal bore, said plunger having an axial bore, external annular depressions separated by annular lands, and radial holes connecting some of these depressions with the axial bore in the plunger; said distributing valve being further characterized by the fact that the radial holes in the casing are in aligned opposing pairs, that there is in the casing, with respect to each such pair of radial holes, a common conduit and two separate passages, and that the two radial holes of each such pair are connected each by one of said separate passages to said common conduit perpendicular to said radial holes, and that said two radial holes and said two passages are symmetrical with respect to the center-line of said common conduit.

2. A fluid-pressure control-valve according to claim 1, still further characterized by the fact that the common conduit and the two passages are in the form of a Y, each branch of the Y connecting with one of the radial holes.

3. In a fluid-pressure control-valve for controlling the flow of operating fluid to and from a double-acting cylinder, the combination of: a valve-seat, having at least five ports, including: a first and second cylinder port, a pump-intake port, a pump-output port, and a sump port; two cylinder-connections; a conduit connecting the first cylinder port to one cylinder connection; a conduit connecting the second cylinder port to the other cylinder connection; a pump intake connection; a conduit connecting the pump-intake port to the pump-intake connection; a pump output connection; a conduit connecting the pump-output port to the pump-output connection; a sump connection; a conduit connecting the sump port to the sump connection; a movable part, movable with respect to the valve-seat in intimate contact therewith, and including openings adapted to register with ports of the valve-seat, circuits connecting some of these openings to others thereof, and closures adapted to register with ports of the valve seat, said movable part having at least four selective settings (identified as: "raise," "hold," "lower," and "float") with respect to the valve seat, and having the following circuits and closures in each of the settings respectively: in "raise" setting, a circuit connecting the pump-output port to the second cylinder port, and a circuit connecting the first cylinder port to the pump-intake port; in "hold" setting, a closure to the first cylinder port, a closure to the second cylinder port, and a circuit connecting the pump-output port to the sump port; in "lower" setting, a circuit connecting the pump-output port to the first cylinder port, and a circuit connecting the second cylinder port to the pump-intake port; and, in "float" setting, circuits connecting the first cylinder port, the second cylinder port, the pump-output port, and the sump port, all together; and a conduit, active in all settings, to connect the sump connection with the pump-intake connection.

4. A fluid-pressure control-valve according to claim 3, in which the "raise" setting also has a circuit connecting the first cylinder port to the sump port.

5. A fluid-pressure control-valve according to claim 3, in which in the last-mentioned conduit there is a check-valve which at all times permits unrestricted flow of fluid through the conduit from the sump connection to the pump-intake connection, but restricts flow of fluid in the opposite direction.

6. A fluid-pressure control-valve according to claim 5, in which the check-valve does not interfere with flow of fluid from the pump-intake port to the pump-intake connection.

7. A fluid-pressure control-valve according to claim 6, in which there is a bleeder between the pump-intake port and a sump connection.

A fluid-pressure control-valve according to claim 3, in which there is a conduit constantly connecting the first cylinder port to the pump-intake port, with a check-valve in said conduit, to permit flow from the pump-intake port to the first cylinder port, but prevent reverse flow from the first cylinder port to the pump-intake port.

GEORGE W. MORK.
GOTTFRIED REUTER.

REFERENCES CITED

The following references are of record in the file of this patent:

UNITED STATES PATENTS

| Number | Name | Date |
| --- | --- | --- |
| 465,480 | Lanchester | Dec. 22, 1891 |
| 1,099,161 | Brown | June 9, 1914 |
| 1,785,289 | Tucker | Dec. 16, 1930 |
| 2,210,144 | Day | Aug. 6, 1940 |
| 2,215,115 | Buffington | Sept. 17, 1940 |
| 2,242,807 | Austin | May 20, 1941 |
| 2,286,027 | Towler | June 9, 1942 |
| 2,286,537 | Gorsuch | June 16, 1942 |
| 2,293,906 | Kvavle et al. | Aug. 25, 1942 |
| 2,360,987 | Temple | Oct. 24, 1944 |
| 2,362,944 | Stephens | Nov. 14, 1944 |
| 2,365,536 | Fischer | Dec. 19, 1944 |
| 2,377,278 | Stephens | May 29, 1945 |